United States Patent
Ducloux et al.

(10) Patent No.: US 7,050,497 B2
(45) Date of Patent: May 23, 2006

(54) PROCESS AND DEVICE FOR THE VIDEO CODING OF HIGH DEFINITION IMAGES

(75) Inventors: Xavier Ducloux, Rennes (FR); Christophe Lejus, Vézin le Coquet (FR); Michel Guillotin, Rennes (FR)

(73) Assignee: Thomson Licensing, Boulogne-Billancourt (FR)

(*) Notice: Subject to any disclaimer, the term of this patent is extended or adjusted under 35 U.S.C. 154(b) by 725 days.

(21) Appl. No.: 09/819,554

(22) Filed: Mar. 28, 2001

(65) Prior Publication Data

US 2002/0172280 A1    Nov. 21, 2002

(51) Int. Cl.
*H04N 7/12*    (2006.01)

(52) U.S. Cl. .................................. 375/240.12

(58) Field of Classification Search ................. 348/571, 348/575, 715, 721, 717, 716, 411, 700, 405, 348/419, 385.1; 375/240.11, 240.1, 240.12, 375/240.21, 240.24, 240.03, 240.25, 240.04, 375/240.06, 240.01; 382/232, 325, 238, 382/239, 236; 386/123
See application file for complete search history.

(56) References Cited

U.S. PATENT DOCUMENTS

| | | | |
|---|---|---|---|
| 5,321,440 A * | 6/1994 | Yanagihara et al. | 348/408 |
| 5,428,403 A * | 6/1995 | Andrew et al. | 348/699 |
| 5,532,744 A * | 7/1996 | Akiwumi-Assani et al. | 348/390 |
| 5,617,145 A * | 4/1997 | Huang et al. | 348/423 |
| 5,986,710 A * | 11/1999 | Kim et al. | 375/240 |
| 5,986,712 A * | 11/1999 | Peterson et al. | 375/240.14 |
| 6,094,455 A * | 7/2000 | Katta | 375/240 |
| 6,148,107 A * | 11/2000 | Ducloux et al. | 382/236 |
| 6,192,083 B1 * | 2/2001 | Linzer et al. | 375/240.29 |
| 6,198,878 B1 * | 3/2001 | Blawat et al. | 386/111 |
| 6,229,849 B1 * | 5/2001 | Mihara | 375/240.05 |
| 6,233,278 B1 * | 5/2001 | Dieterich | 375/240.03 |
| 6,504,850 B1 * | 1/2003 | Kato et al. | 370/465 |
| 6,573,945 B1 * | 6/2003 | Wu et al. | 348/584 |

FOREIGN PATENT DOCUMENTS

EP    0720372    * 3/1996

* cited by examiner

*Primary Examiner*—Vu Le
*Assistant Examiner*—Behrooz Senfi
(74) *Attorney, Agent, or Firm*—Joseph J. Laks; Ronald H. Kurdyla; Guy H. Eriksen

(57) ABSTRACT

The process implements a global regulation at the level of a horizontal band of the image, band consisting of panels, an encoder being assigned to each panel, as a function of a preset bit rate for the band and on the basis of a single Video Buffering Verifier (VBV) taking into account the state of the buffer memories of the encoders of the band.

9 Claims, 2 Drawing Sheets

| slice 1.1 | slice 1.2 | slice 1.3 |
| --- | --- | --- |
| Encoder n°1 | Encoder n°2 | Encoder n°3 |
| slice 34.1 | slice 34.2 | slice 34.3 |
| slice 35.4 | slice 35.5 | slice 35.6 |
| Encoder n°4 | Encoder n°5 | Encoder n°6 |
| slice 68.4 | slice 68.5 | slice 68.6 |

PROCESS AND DEVICE FOR THE VIDEO CODING OF HIGH DEFINITION IMAGES

FIELD OF THE INVENTION

The invention relates to a process and device for the MPEG type video coding of high definition (HD) images.

BACKGROUND OF THE INVENTION

The coding of high definition moving images, for television or film, requires in the current state of the art the use of several compression cores in parallel, these being coding circuits or processors for data compression. The image is thus chopped into several zones, for example into horizontal or vertical bands or into panels, each image zone or portion being coded by a dedicated compression core.

The output bit rate regulation utilized in MPEG type video encoders is carried out with the aid of a regulating loop acting on the DCT coefficients quantization step. An increase in the quantization step results in a reduction in the coding bits required for coding these coefficients and hence in the output bit rate and vice versa.

In the processing of the high definition image, the quantization step of each encoder is regulated as a function of the data bit rate assigned to it. Jumps in quantization step at the boundary between bands or panels may, consequently, betray the chopping of the image.

An aim of the invention is to alleviate the aforesaid drawbacks.

SUMMARY OF THE INVENTION

A subject of the invention is a process for the MPEG type video coding of high definition images, an image being split into panels, an encoder being assigned to each panel, one or more panels constituting, over the length of the image, a horizontal band of the image, wherein a global regulation, at the level of a band, is implemented as a function of a preset bit rate for the band and on the basis of a single Video Buffering Verifier (VBV) taking into account the state of the buffer memories of the encoders of the band.

According to a particular characteristic, the preset bit rate allocated to a horizontal band for the calculation of a quantization step is dependent on the cost of coding the band relative to the cost of coding the complete image.

According to another particular characteristic, the coding cost is calculated on the basis of a preanalysis of the image.

According to another characteristic the coding cost is calculated on the basis of the cost of coding or complexity of a previous image.

According to another characteristic, the preset bit rate for a horizontal band is in part the preset bit rate for the complete image, divided by the number of horizontal bands, in part a dynamic allocation of the preset bit rate for the complete image, dependent on the complexity of the band.

The invention also relates to a device for the video coding of high resolution images, an image being divided into several horizontal bands and the bands into panels, the device comprising a set of encoders of MPEG type, each encoder being dedicated to the coding of a panel, wherein each encoder of one and the same band calculates a quantization step per row of macroblocks as a function of the same information, corresponding to the sum of the coding costs and of the output bit rates of the set of encoders of this band and corresponding to a unique Video Buffering Verifier (VBV) for the band, so as to obtain one and the same quantization step, and in that the encoders perform a coding by dynamic allocation, the bit rate allotted to the set of encoders of a band being calculated on the basis of the complexity of coding the band relative to the complexity of coding the complete image.

The combination of two mechanisms for regulating quantization, namely:

a unique and global regulating of the quantization of the zones belonging to one and the same horizontal band, a dynamic allocation of bit rate for the horizontal bands as a function of their complexity, enables the quantization to be made homogeneous over the entire image and the aforesaid effect of boundaries to be smoothed.

The process can be applied to any type of chopping of the HD image:

a chopping into vertical bands uses the first mechanism, a chopping into horizontal bands uses the second mechanism, a chopping into panels amalgamates the two mechanisms.

This process does not in any way modify the existing basic regulation, but constitutes a higher layer in respect of this regulation. The basic regulation must simply have as characteristics:

that it accept a change of bit rate at each image, that it be implemented at slice level.

In the description, a distinction will be made between a band of the image which consists of one or more panels in the horizontal direction of the image, a panel being processed by a specific coding core, a row designating a horizontal row of macroblocks consisting of a succession of macroblocks over the length of the image, and a slice which, according to the MPEG standard, consists of a continuous series of macroblocks all forming part of the same horizontal row of macroblocks.

Represented in FIGS. 1 to 3 is the chopping of the high definition image into bands or panels as well as the chopping of this image into rows consisting of slices. Slice 1.1 corresponds to the first row in the image coded by encoder No. 1, slice m. n corresponding to the mth row in the image coded by the nth encoder.

BRIEF DESCRIPTION OF THE DRAWINGS

Other features and advantages of the invention will become clearly apparent in the following description given by way of nonlimiting example and with regard to the appended figures which represent.

DETAILED DESCRIPTION OF PREFERRED EMBODIMENTS

Figures 1, 2:
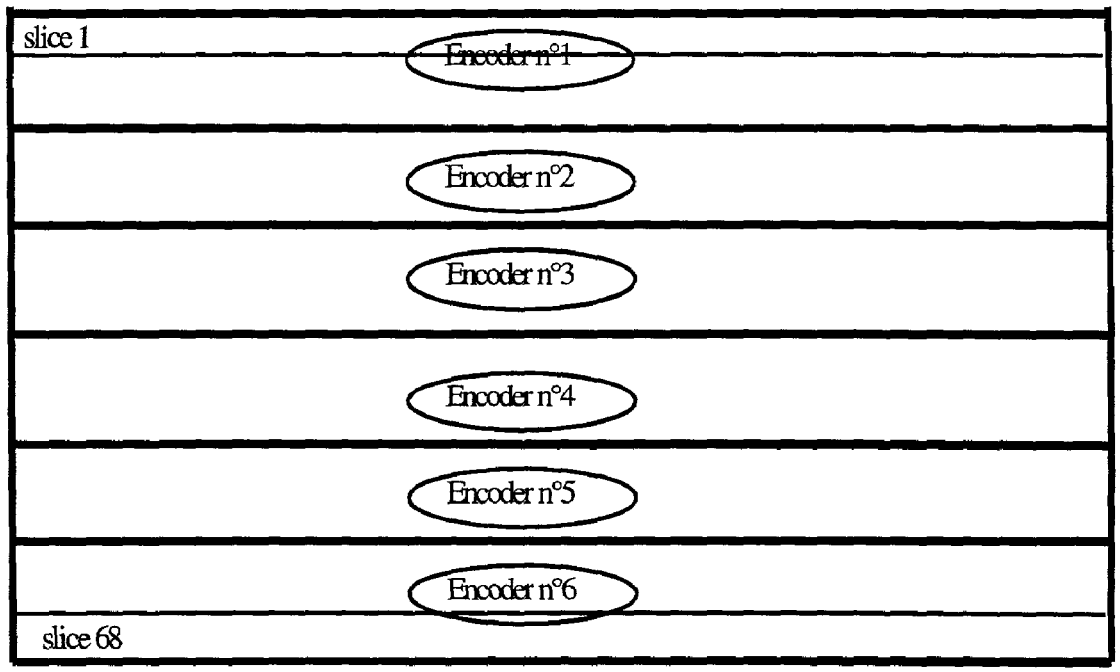
FIG. 1, a chopping of the image into horizontal bands
FIG. 2, a chopping of the image into vertical bands.

Before the coding of an image by an MPEG type video encoder, a calculation of the number of bits required and of the step for quantizing the DCT coefficients is performed as a function:

of the fixed output bit rate (preset bit rate),
of the cost of coding the previously coded images,
of the state of the buffer memory at the decoder, virtual model managed at the encoder,
of the rules for the stability of quality of images.

In the course of the coding of the image, a real-time regulation can be carried out as follows: the quantization step of a slice is adjusted as a function of the difference between the actual cost of coding and the predicted cost of coding the previous slice or slices of the image.

The global regulating process implemented in the invention consists in managing the regulation over each horizontal band of the image as if this band were processed by a single encoder. Each encoder operates the regulating principle set forth above by taking account of the common regulating data relating to the band:

the unique output bit rate, equal to the sum of the individual bit rates of each encoder of the band,
the cost of coding the band in the previously coded images, equal to the sum of the individual costs,
the data relating to a unique model of video memory verifier (VBV), whose memory capacity is the sum of the individual capacities relating to each encoder of a band,
the cost of coding the row in the current image, equal to the sum of the individual costs of the slices.

Each panel of one and the same band operates the same regulating algorithm in parallel on these common key data so as to culminate in the same quantization step for a row of macroblocks, row after row.

To utilize these common key data, an exchange of the data specific to each compression core must be effected.

The size of the decoder memory and the output preset bit rate do not need to be exchanged, since they are not parameters specific to the compression cores, and they are generally provided by a supervisory facility.

The only specific data are:

the costs of coding (or complexities) of the DCT coefficients of the slices processed by the encoder,
the total cost, including the MPEG syntax cost and any stuffing, of the image portion processed by the encoder,
the number of bits transmitted as output from the encoder during the processing of the current image.

The complexities or the costs of coding the slices are for example used to correct the quantization step of a next row of macroblocks as a function of the coding cost error of a previous row. The complexity or the cost of coding the whole band (summation of the preceding costs over the set of rows of macroblocks) is used to predict the number of bits required for coding this band for the succeeding images.

The slices complexity is the product of the cost of coding the slice times the quantization step used. It is calculated on the basis of the cost of coding the current image (intra or inter).

The total cost of coding the image portion and the number of actual bits transmitted during this coding make it possible to accurately manage the state of the decoder buffer memory, image after image, that is to say the state of fill and the margin of the decoder buffer memory, on the basis of the video memory verifier or VBV (Video Buffering Verifier) model.

The total cost of coding the image portion is obtained for example by fine measurement of the position of the write pointer in the buffer memory of the dedicated encoder at the start and at the end of coding this image.

The number of actual bits transmitted is obtained for example by fine measurement of the position of the read pointer in the buffer memory of the dedicated encoder, at the start and at the end of coding of the current image.

These exchanges of data required for global regulation of the encoders may be made at low frequencies. Thus, as far as the complexity of the slices is concerned, the exchanging of this information can be carried out after the coding of each slice of macroblocks. The quantization step for the following slice (and row) is corrected as a function of the coding cost error for the previous row. The data item to be exchanged is less than 32 bits and the exchange can be made over a duration of slices of macroblocks and not necessarily in the interval between two consecutive slices, the induced delay of a slice not being penalizing to the general quality of coding, i.e. a mean bit rate of the order of 65 kbits/s per encoder. The passband required for this exchange is therefore limited.

For the total cost of coding the image and the number of bits at the output, this cue being updated after coding the image, the exchange can be carried out at the image rate and can be made between two consecutive images, for example in the frame blanking interval. The maximum dimensioning for these two data items and for the complexity cue for the last row of the image shows that the exchange requires only 70 bits, i.e. a mean bit rate of the order of 2 kbits/s per encoder.

The quantization carried out by the various encoders, for a horizontal band, for the complete image in the case where the image is chopped into vertical bands, as represented in FIG. 2, therefore takes place in the same way as if it were a global quantization performed by a single compression core.

It may be observed, as far as the encoders are concerned, that the video memory verifier (VBV virtual decoder) common to the panels of one and the same band, is no longer the inverse representation of the state of the encoder buffer, as is the case in an encoder with single compression core. The cost of coding an image is different for each of the encoders making up the band. It is directly proportional to the complexity since the quantization step is uniform, that is to say identical for each of the encoders of the band, for each horizontal row of macroblocks. The encoder buffers do not therefore have the same instantaneous fill. Any risk of these buffers drying up or overflowing is however dispensed with, since an auto-regulation of the virtual common encoder buffer (or decoder buffer) is in fact carried out by reading, at the output of the encoder buffers, a number of bits per image which is directly equal to the coding cost. The instantaneous discrepancies of the encoder buffers with respect to the virtual common model are catered for by the buffer's dryup and overflow margins, managed in the model.

The concept of "virtual" decoder buffer takes its full meaning here since this decoder buffer is not the image of the encoder buffer. There are indeed three distinct encoder buffers per band but management is performed on the basis of a virtual model of a single decoder buffer.

Figures 3, 4:
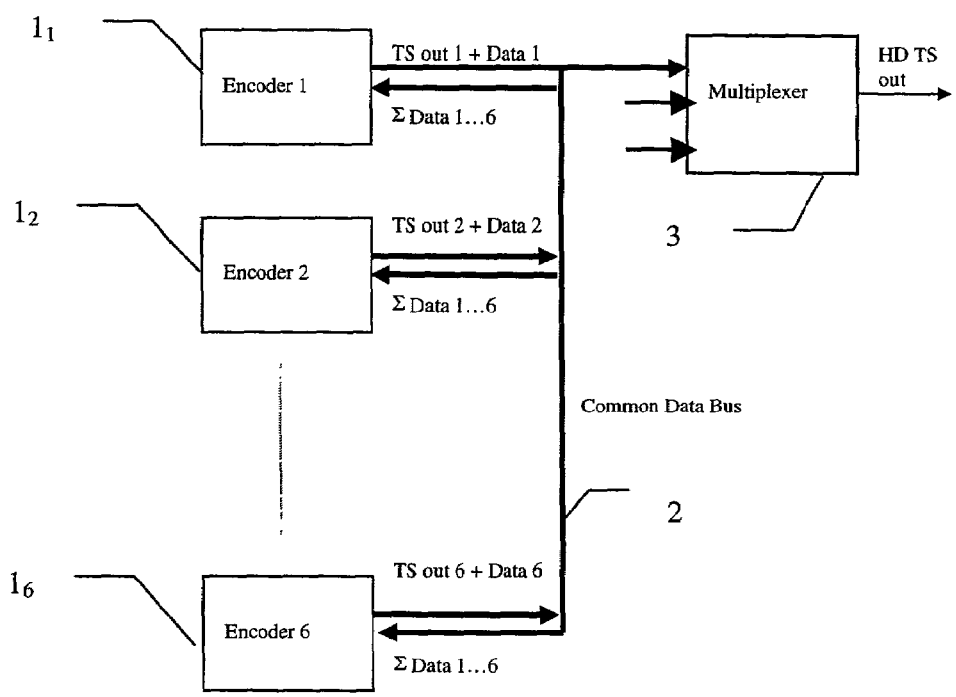
FIG. 3, a chopping of the image into panels.
FIG. 4, a schematic of the regulating device.

FIG. 4 describes a coding device according to the invention.

The image is for example chopped into 6 panels, as represented in FIG. 3. Each of the panels is controlled by a dedicated encoder, the encoders $1_1$ to $1_6$ in FIG. 4. A data exchange bus 2 is linked to the various encoders and to a multiplexer 3.

Each encoder transmits its transport stream (TS) over a multiplexing bus. The data of each encoder are multiplexed on the bus. This bus is also utilized for the exchanges of data between the encoders and in particular for the transmission, to each encoder, of the data required, relating to the encoders 1 to 6, for global regulation. The multiplexing bus is linked to a multiplexer 3 which receives other programme streams and transmits all these programmes at its output, including the HD transport stream, while inserting the necessary signalling.

It is also possible not to utilize any multiplexing bus. In which case, each encoder transmits its transport stream to the multiplexer together with the information required for global regulation. The multiplexer is then responsible for the multiplexing of these various TS streams so as to construct a HD TS stream, hence for the high definition image. It is also responsible for recovering the information from each of the encoders so as to transmit it to all the encoders.

The implementation of global regulation does not therefore require the installing of a specific bus between elementary encoders for the exchanging of information, this communication link between the encoders possibly being the common bus for multiplexing the video streams already existing in a conventional HD image coding device. The high definition data transmission stream, at the output of the coding device, can of course have a fixed bit rate or variable bit rate.

The second process implemented in this invention, namely the statistical multiplexing of the bit rate of the horizontal bands consists in allotting, in a dynamic manner, a bit rate to each horizontal band of the image as a function of its complexity.

In the case where one does not wish to implement the statistical multiplexing, the preset bit rate for the global image is distributed equitably between the various horizontal bands, half the bit rate for each of them in our example.

In the case of statistical multiplexing, a different bit rate is allocated for each band, so as subsequently to be distributed equitably between the panels relating to each of the bands.

One idea of the invention is to combine the statistical multiplexing of horizontal bands with global regulation within a horizontal band.

This multiplexing does not rely on an architecture with a master (bit rate allocator) and slaves (encoders providing a complexity). The exchanges implemented in the global regulating mechanism mean that each encoder has perfect knowledge of the total complexity of the high definition HD image and hence of its relative weighting.

Each encoder itself carries out its bit rate allocation on the basis of the bit rate of the HD programme provided by supervision:

$$Di = \left(p\frac{Xi}{X} + (1-p)\frac{n}{N}\right)D$$

where:
Di is the bit rate of the horizontal band (n encoders),
D is the total HD bit rate,
Xi is the complexity of the horizontal band (n encoders),
X is the total complexity of the HD image,
n is the number of encoders per horizontal band,
N is the total number of encoders,
p is the percentage of bit rate assigned to dynamic allocation.

(1−p) corresponds to the percentage of bit rate assigned to uniform allocation, for the entire image consisting of (N/n) bands. This percentage is applied pro rata to each band according to the number of bands.

p corresponds to the percentage of bit rate assigned to the statistical multiplexing. The statistical allocation must in fact be weighted so as to smooth the regulation and avoid overly large variations.

The calculation of the bit rate Di, which is the preset bit rate per horizontal band, is, in our example, achieved on the basis of complexity measurements carried out by a preanalysis stage. The allocation of the bit rate is done after a first coding or preanalysis of the image, that is to say a posteriori. The allocation of the bit rate is therefore optimal.

Still in our example, only the spatial complexity of the image is utilized for the dynamic allocation of the bit rate. The eye being much more sensitive to coding defects in regions with small movements, there is no reason to favour the bands of highest temporal complexity.

The preset bit rate thus calculated is then utilized for the previously explained bandwise regulation.

It would of course be equally conceivable, in order to perform the dynamic allocation, to utilize the temporal complexity of the image and/or the complexity of a previously coded image, the latter making it possible to perform a priori allocation of the bit rate for the current image.

The implemented dynamic allocation of bit rate makes it possible at any moment to achieve very uniform quantization of the image, which eliminates the visible effect of boundaries between horizontal bands, while slightly favouring the bands of the image of lesser motion.

The device as represented in FIG. 4 allows both the implementation of the global regulation process and also the process which combines global regulation with dynamic allocation.

The combination of the two mechanisms for regulating quantization within one and the same HD encoder makes it possible to offer optimum image quality:
the row-wise quantization of macroblocks is uniform, thereby avoiding a possible swarming effect (activity from one bloc of an image to another due to the modifying of the quantization step),
the row-wise quantization is as reactive as in a monoprocessor encoder, thus making it possible to compensate effectively for the most critical cases, the optimal bit rate is assigned to each band of the image while taking account of the subjective criteria.

Moreover, it requires only a restricted passband for the exchanges of data between processors. This regulation can be coupled with mechanisms for detecting changes of scenes (cuts) and of adaptive GOPs (standing for Group Of Pictures), the GOP being adapted in such a way that the intra image corresponds to a change of scene which gives the coding even greater performance. By virtue of the mechanism for exchanging information between encoders, it is in fact possible to exchange information required for implementing such mechanisms, for example the type of image.

What is claimed is:

1. Process for the MPEG type video coding of high definition images, an image being split into panels, an encoder being assigned to each panel, two or more panels constituting, over the length of the image, a horizontal band of the image, wherein a rate control is implemented at a band level as a function of a preset bit rate for the band, each encoder of the band taking into account a same Video Buffering Verifier (VBV) calculated for the whole band.

2. Process according to claim 1, wherein the preset bit rate allocated to a horizontal band is dependent on the cost of coding the band relative to the cost of coding a complete image.

3. Process according to claim 2, wherein the coding cost is calculated on the basis of a preanalysis of the image.

4. Process according to claim 2, wherein the coding cost is calculated on the basis of the cost of coding or complexity of a previous image.

5. Process according to claim 2, wherein the preset bit rate for a horizontal band is in part the preset bit rate for the complete image, divided by the number of horizontal bands, in part a dynamic allocation of the preset bit rate for the complete image, dependent on the complexity of the band.

6. Process according to claim 2, wherein the preset bit rate of a horizontal band is equal to:

$$Di = \left(p\frac{Xi}{X} + (1-p)\frac{n}{N}\right)D$$

where:
Di is the bit rate of the horizontal band,
D is the bit rate for the global image,
Xi is the complexity of the horizontal band,
X is the total complexity of the image,
n is the number of panels per horizontal band,
N is the total number of panels in the image,
p is the percentage of bit rate assigned to dynamic allocation relative to the global bit rate.

7. Device for the video coding of high resolution images, an image being divided into several horizontal bands and the bands into panels, the device comprising a set of encoders of MPEG type, each encoder being dedicated to the coding of a panel, wherein each encoder is coupled to another encoder of the same band for exchanging coding data in order to implement a global rate control at a band level through a same Video Buffering Verifier (VBV) for said band.

8. Device according to claim 7, comprising a multiplexing bus linking the encoders for the transmission of the transport streams of the encoders, wherein said coding data are exchanged over said multiplexing bus.

9. Device according to claim 7, wherein each encoder comprises means for calculating a dynamic allocation, the bit rate allotted to the set of encoders of a band being calculated on the basis of the complexity of coding the band relative to the complexity of coding the complete image.

* * * * *